United States Patent
Ono et al.

(10) Patent No.: US 11,005,349 B2
(45) Date of Patent: May 11, 2021

(54) ELECTRIC MOTOR SYSTEM, AND TURBO COMPRESSOR PROVIDED WITH SAME

(71) Applicant: DAIKIN INDUSTRIES, LTD., Osaka (JP)

(72) Inventors: Takaaki Ono, Osaka (JP); Yusuke Irino, Osaka (JP); Yuji Nakazawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/089,396

(22) Filed: Nov. 4, 2020

(65) Prior Publication Data
US 2021/0050765 A1 Feb. 18, 2021

Related U.S. Application Data

(63) Continuation of application No. PCT/JP2019/015161, filed on Apr. 5, 2019.

(30) Foreign Application Priority Data

May 8, 2018 (JP) .............................. JP2018-089645
Nov. 12, 2018 (JP) .............................. JP2018-211950

(51) Int. Cl.
*H02K 7/09* (2006.01)
*H02K 21/04* (2006.01)
(Continued)

(52) U.S. Cl.
CPC ........... *H02K 21/046* (2013.01); *F25B 1/053* (2013.01); *H02K 7/09* (2013.01); *H02K 7/14* (2013.01); *H02K 11/30* (2016.01)

(58) Field of Classification Search
CPC ........ H02K 21/046; H02K 11/30; H02K 7/09; H02K 7/14; F25B 1/053
(Continued)

(56) References Cited

U.S. PATENT DOCUMENTS 5,355,040 A * 10/1994 New ................... F16C 32/0402
310/90
6,563,244 B1 * 5/2003 Yamauchi ........... F16C 32/0459
310/154.02
(Continued)

FOREIGN PATENT DOCUMENTS

EP    3 168 487 A1    5/2017
JP    2004-336968 A   11/2004
(Continued)

OTHER PUBLICATIONS

International Search Report of corresponding PCT Application No. PCT/JP2019/015161 dated Jul. 2, 2019.
(Continued)

*Primary Examiner* — Naishadh N Desai
(74) *Attorney, Agent, or Firm* — Global IP Counselors, LLP (57) ABSTRACT

An electric motor system includes a drive shaft that rotationally drives a load, a bearingless motor, a power source unit, and a control unit. The bearingless motor includes a rotor and a stator having armature and support windings. The bearingless motor rotationally drives the drive shaft and supports a radial load of the drive shaft in a contactless manner. The power source unit applies a voltage to the armature and support windings. The control unit controls the power source unit so that a radial support force that is a sum of a radial support force caused by a support current and a radial support force caused by both the support current and an armature current is output, and so that one of an armature voltage across the armature winding and the support current is increased and the other of the armature voltage and the support current is decreased.

17 Claims, 4 Drawing Sheets

(51) Int. Cl.
   *F25B 1/053*    (2006.01)
   *H02K 11/30*   (2016.01)
   *H02K 7/14*    (2006.01)

(58) Field of Classification Search
   USPC ....................................................... 310/90.5
   See application file for complete search history.

(56) References Cited

U.S. PATENT DOCUMENTS

| | | | |
|---|---|---|---|
| 2007/0164627 A1* | 7/2007 | Brunet ................ | F16C 32/0476 310/90.5 |
| 2015/0233422 A1* | 8/2015 | Irino ................... | F16C 32/0461 310/90.5 |
| 2017/0108038 A1 | 4/2017 | Jastrzebski et al. | |
| 2017/0234364 A1* | 8/2017 | Sakawaki ........... | F16C 32/0451 310/90.5 |

FOREIGN PATENT DOCUMENTS

| | | |
|---|---|---|
| JP | 2008-295206 A | 12/2008 |
| JP | 2014-74492 | 4/2014 |
| WO | 2013/015885 A1 | 1/2013 |

OTHER PUBLICATIONS

International Preliminary Report of corresponding PCT Application No. PCT/JP2019/015161 dated Nov. 19, 2020.
European Search Report of corresponding EP Application No. 19 79 9098.9 dated Mar. 25, 2021.

\* cited by examiner

ELECTRIC MOTOR SYSTEM, AND TURBO COMPRESSOR PROVIDED WITH SAME

CROSS-REFERENCE TO RELATED APPLICATIONS

This is a continuation of International Application No. PCT/JP2019/015161 filed on Apr. 5, 2019, which claims priority to Japanese Patent Application Nos. 2018-089645 filed on May 8, 2018 and 2018-211950 filed on Nov. 12, 2018. The entire disclosures of these applications are incorporated by reference herein.

BACKGROUND

Field of Invention

The present disclosure relates to an electric motor system, and a turbo compressor provided with the same.

Background Information

A conventionally known bearingless motor has an electric motor function to rotationally drive a rotor and a magnetic bearing function to control the position of the rotor in a radial direction (for example, Japanese Unexamined Patent Application Publication No. 2004-336968). The bearingless motor in the literature given above can maintain magnetic linearity and efficiently generate a support force for magnetically supporting the rotor.

SUMMARY

A first aspect of the present disclosure is directed to an electric motor system (30). The electric motor system (30) includes a drive shaft (31) that rotationally drives a load (21); a bearingless motor (40, 50) that includes a rotor (41, 51) and a stator (44, 54) having an armature winding (46a to 46c, 56a to 56c) and a support winding (47a to 47c, 57a to 57c) and that rotationally drives the drive shaft (31) and supports a radial load of the drive shaft (31) in a contactless manner; a power source unit (61, 62) for applying a voltage to the armature winding (46a to 46c, 56a to 56c) and the support winding (47a to 47c, 57a to 57c); and a control unit (60) that controls the power source unit (61, 62) so that a radial support force that is a sum of a radial support force caused by a support current IS, which is a current flowing through the support winding (47a to 47c, 57a to 57c), and a radial support force caused by both the support current IS and an armature current IA, which is a current flowing through the armature winding (46a to 46c, 56a to 56c), is output and so that one of an armature voltage VA, which is a voltage across the armature winding (46a to 46c, 56a to 56c), and the support current IS, which is a current flowing through the support winding (47a to 47c, 57a to 57c), is increased and the other of the armature voltage VA and the support current IS is decreased.

DETAILED DESCRIPTION OF EMBODIMENT(S)

Air Conditioner

Figure 1:
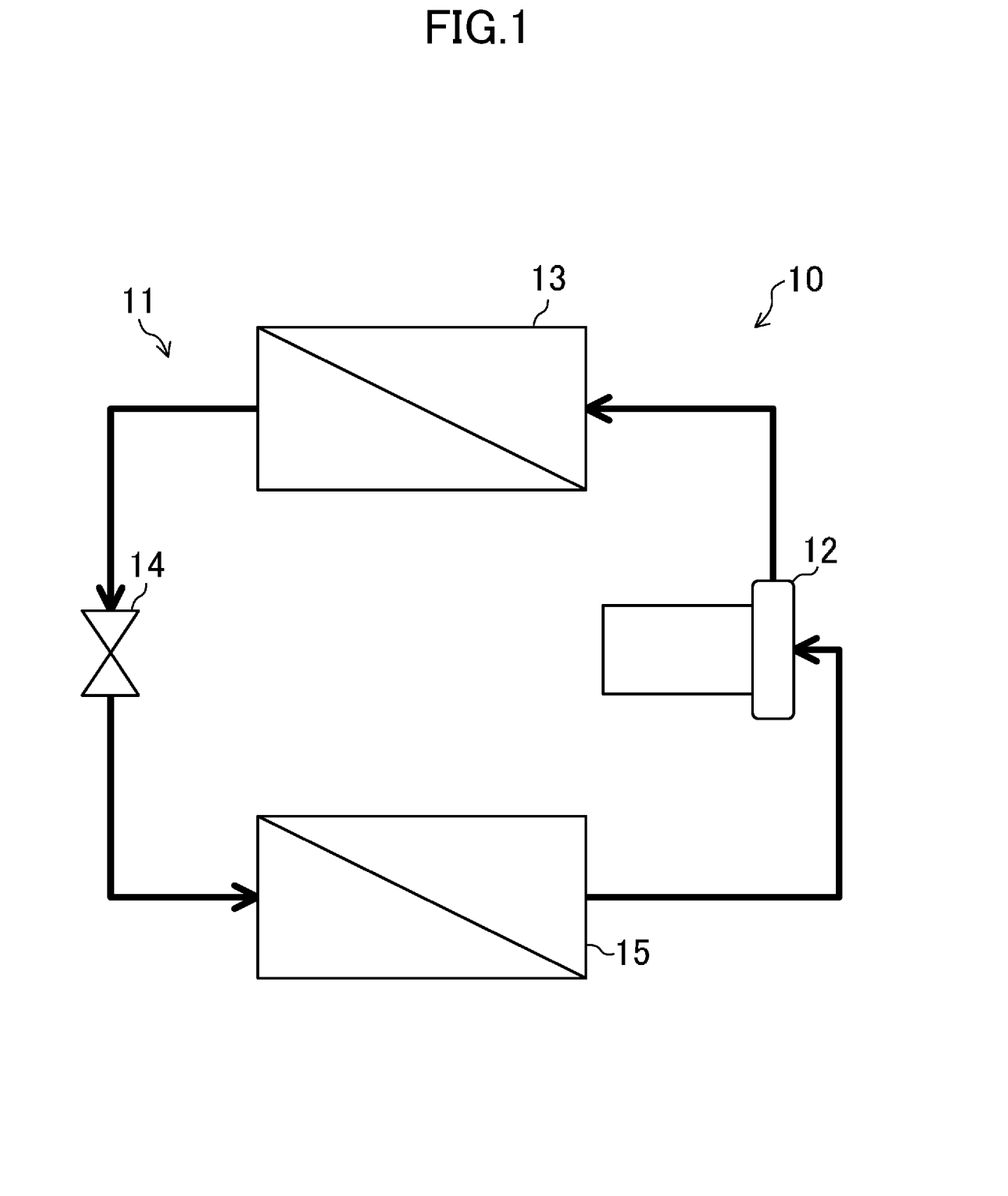
FIG. 1 is a schematic diagram exemplarily illustrating the configuration of an air conditioner according to an embodiment.

FIG. 1 exemplarily illustrates the configuration of an air conditioner (10) according to an embodiment. The air conditioner (10) includes a refrigerant circuit (11). The refrigerant circuit (11) has a turbo compressor (12), a condenser (13), an expansion valve (14), and an evaporator (15) and is configured to perform a refrigeration cycle by circulating refrigerant therethrough. For example, the condenser (13) and the evaporator (15) are each configured as a cross-fin heat exchanger, and the expansion valve (14) is configured as an electrically powered valve.

Turbo Compressor

Figure 2:
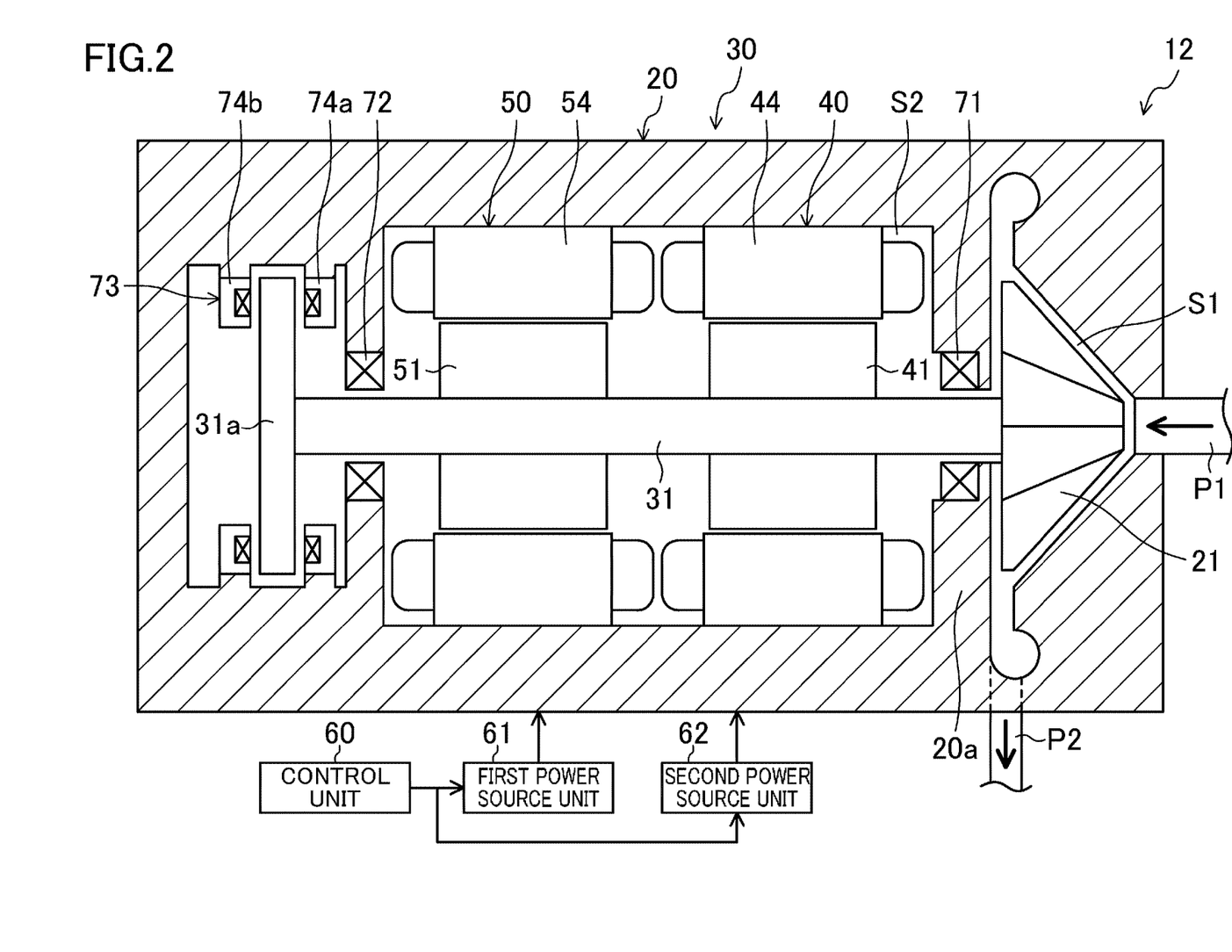
FIG. 2 is a longitudinal sectional view exemplarily illustrating the configuration of a turbo compressor.

FIG. 2 exemplarily illustrates the configuration of the turbo compressor (12) illustrated in FIG. 1. The turbo compressor (12) is disposed in the refrigerant circuit (11) and is configured to compress refrigerant by using an impeller (21) described below. In the illustrated example, the turbo compressor (12) includes a casing (20), the impeller (21), and an electric motor system (30). The electric motor system (30) has a drive shaft (31), first and second bearingless motors (40, 50), a control unit (60), and a first and second power source units (61, 62). In the illustrated example, the electric motor system (30) further has a first and second touch-down bearings (71, 72) and a thrust magnetic bearing (73).

In the following description, the term "axial direction" refers to a direction of an axis of rotation, which is a direction of an axis of the drive shaft (31), and the term "radial direction" refers to a direction perpendicular to the axial direction of the drive shaft (31). The term "outer circumferential side" refers to a side farther from the axis of the drive shaft (31), and the term "inner circumferential side" refers to a side closer to the axis of the drive shaft (31).

Casing

The casing (20) is shaped into a cylinder having both ends closed and is arranged such that the axis line of the cylinder is directed horizontally. The inner space of the casing (20) is partitioned by a wall portion (20a), with the space to the right of the wall portion (20a) forming an impeller chamber (S1) that accommodates the impeller (21) and the space to the left of the wall portion (20a) forming an electric motor chamber (S2) that accommodates the first and second bearingless motors (40, 50). The electric motor chamber (S2) also accommodates the first and second bearingless motors (40, 50), the first and second touch-down bearings (71, 72), and the thrust magnetic bearing (73), and these components are fixed to an inner circumferential wall of the electric motor chamber (S2).

Drive Shaft

The drive shaft (31) is provided to rotationally drive a load (21) (in the illustrated example, the impeller (21)). In the illustrated example, the drive shaft (31) extends in the axial direction through the casing (20) and couples the impeller (21) to the first and second bearingless motors (40, 50). Specifically, the impeller (21) is fixed to one end of the drive shaft (31), and the first and second bearingless motors (40, 50) are arranged in a middle portion of the drive shaft (31). A disk-shaped portion (hereinafter referred to also as a disk portion (31a)) is disposed at the other end of the drive shaft (31) (that is, the end on the opposite side to the one end to which the impeller (21) is fixed). The disk portion (31a) is formed of a magnetic material (for example, iron).

Impeller (Load)

The impeller (21) is formed by a plurality of blades so as to have a substantially conical outer shape. The impeller (21) is accommodated in the impeller chamber (S1) in such a manner as to be fixed to the one end of the drive shaft (31). A suction pipe (P1) and a discharge pipe (P2) are connected to the impeller chamber (S1). The suction pipe (P1) is provided to introduce refrigerant (fluid) into the impeller chamber (S1) from the outside. The discharge pipe (P2) is provided to return high-pressure refrigerant (fluid) compressed in the impeller chamber (S1) to the outside. That is, in the illustrated example, the impeller (21) and the impeller chamber (S1) constitute a compression mechanism.

Bearingless Motor

The first and second bearingless motors (40, 50) have the same configuration. Thus, only the configuration of the first bearingless motor (40) will be described.

The first bearingless motor (40) has a rotor-stator pair constituted by a rotor (41) and a stator (44), and is configured to rotationally drive the drive shaft (31) and to support the radial load of the drive shaft (31) in a contactless manner. The rotor (41) is fixed to the drive shaft (31), and the stator (44) is fixed to an inner circumferential wall of the casing (20).

Figure 3:
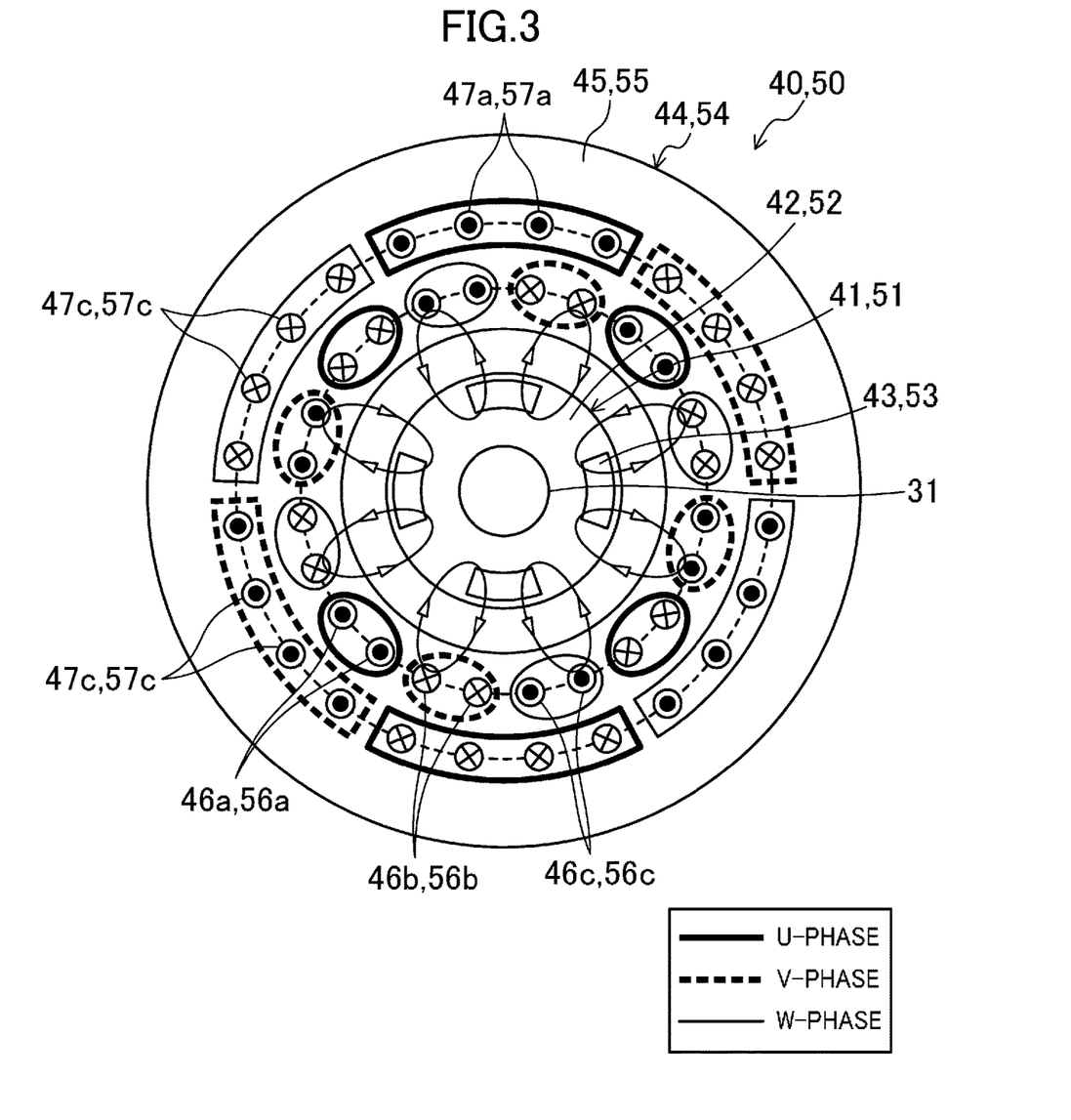
FIG. 3 is a cross-sectional view exemplarily illustrating the configuration of a bearingless motor.

As illustrated in FIG. 3, in the illustrated example, the first bearingless motor (40) is configured as a consequent-pole bearingless motor.

The rotor (41) of the first bearingless motor (40) has a rotor core (42) and a plurality of (in the illustrated example, four) permanent magnets (43) embedded in the rotor core (42). The rotor core (42) is formed of a magnetic material (for example, layered steel plates) and is formed into a columnar shape. The rotor core (42) has a shaft hole formed therein at a center portion thereof, through which the drive shaft (31) extends.

The plurality of permanent magnets (43) are arranged in the circumferential direction of the rotor (41) at predetermined pitch angles (in the illustrated example, at pitch angles of 90°). The side of each of the four permanent magnets (43) nearer the outer circumferential surface is N pole, and portions of the outer circumferential surface of the rotor core (42) that are positioned between the four permanent magnets (43) in the circumferential direction of the rotor (41) are pseudo-S poles. The side of each of the four permanent magnets (43) nearer the outer circumferential surface may be the S pole.

The stator (44) of the first bearingless motor (40) is formed of a magnetic material (for example, layered steel plates), and has a back yoke portion (45), a plurality of tooth portions (not illustrated), and armature windings (46a to 46c) and support windings (47a to 47c) wound around the tooth portions. The back yoke portion (45) is formed into a cylindrical shape. The armature windings (46a to 46c) and the support windings (47a to 47c) are wound around the respective tooth portions by using a distributed winding method. The armature windings (46a to 46c) and the support windings (47a to 47c) may be wound around the respective tooth portions by using a concentrated winding method.

The armature windings (46a to 46c) are windings wound on the inner circumferential side of the tooth portions. The armature windings (46a to 46c) are constituted by U-phase armature windings (46a) in portions enclosed by the thick solid line in FIG. 3, V-phase armature windings (46b) in portions enclosed by the thick broken line in FIG. 3, and W-phase armature windings (46c) in portions enclosed by the thin solid line in FIG. 3.

The support windings (47a to 47c) are windings wound on the outer circumferential side of the tooth portions. The support windings (47a to 47c) are constituted by U-phase support windings (47a) in portions enclosed by the thick solid line in FIG. 3, V-phase support windings (47b) in portions enclosed by the thick broken line in FIG. 3, and W-phase support windings (47c) in portions enclosed by the thin solid line in FIG. 3.

Touch-Down Bearings

The first touch-down bearing (71) is disposed near one end (the right end in FIG. 2) of the drive shaft (31), and the second touch-down bearing (72) is disposed near the other end of the drive shaft (31). The first and second touch-down bearings (71, 72) are configured to support the drive shaft (31) when the first and second bearingless motors (40, 50) are not energized (that is, when the drive shaft (31) is not levitated).

Thrust Magnetic Bearing

The thrust magnetic bearing (73) has a first and second thrust electromagnets (74a, 74b) and is configured to support the disk portion (31a) of the drive shaft (31) in a contactless manner by using an electromagnetic force. Specifically, the first and second thrust electromagnets (74a, 74b) are each formed into an annular shape. The first and second thrust electromagnets (74a, 74b) face each other with the disk portion (31a) of the drive shaft (31) interposed therebetween, and support the disk portion (31a) of the drive shaft (31) in a contactless manner by using a combined electromagnetic force of the first and second thrust electromagnets (74a, 74b).

Various Sensors

The components of the electric motor system (30) are provided with various sensors (not illustrated) such as a position sensor, a current sensor, and a rotational speed sensor. For example, the first and second bearingless motors (40, 50) are each provided with a position sensor (not illustrated) that outputs a detection signal corresponding to the position of the corresponding rotor (41, 51) in the radial direction, and the thrust magnetic bearing (73) is provided with a position sensor (not illustrated) that outputs a detection signal corresponding to the position of the drive shaft (31) in the thrust direction (axial direction). These position sensors are each constituted by, for example, an eddy-current displacement sensor that detects a gap (distance) between the sensor and the object being measured.

Control Unit

The control unit (60) is configured to generate and output an armature voltage command value, a support voltage command value, and a thrust voltage command value on the basis of detection signals from the various sensors disposed in the components of the electric motor system (30) and information such as the target rotational speed of the drive shaft (31), so that the rotational speed of the drive shaft (31) becomes equal to a predetermined target rotational speed, with the drive shaft (31) being supported in a contactless manner. The armature voltage command value is a command value for controlling the voltage to be supplied to the armature windings (46a to 46c, 56a to 56c) of the first and second bearingless motors (40, 50). The support voltage command value is a command value for controlling the voltage to be supplied to the support windings (47a to 47c, 57a to 57c) of the first and second bearingless motors (40, 50). The thrust voltage command value is a command value for controlling the voltage to be supplied to windings (not illustrated) of the first and second thrust electromagnets (74a, 74b) of the thrust magnetic bearing (73). The control unit (60) is constituted by, for example, a computational processing unit such as a CPU, a storage unit such as a memory that stores a program for activating the computational processing unit or information, and so on.

Power Source Unit

The first power source unit (61) is configured to supply a voltage to the armature windings (46a to 46c, 56a to 56c) of the first and second bearingless motors (40, 50) in accordance with the armature voltage command value output from the control unit (60). The second power source unit (62) is configured to supply a voltage to the support windings (47a to 47c, 57a to 57c) of the first and second bearingless motors (40, 50) in accordance with the support voltage command value output from the control unit (60). By controlling the voltage to be applied to the armature windings (46a to 46c, 56a to 56c) and the support windings (47a to 47c, 57a to 57c) of the first and second bearingless motors (40, 50), it is possible to control the current flowing through the windings (46a to 46c, 56a to 56c, 47a to 47c, 57a to 57c) to control the torque and support force generated by the first and second bearingless motors (40, 50). The first and second power source units (61, 62) are each constituted by, for example, a PWM (Pulse Width Modulation) amplifier. The first and second power source units (61, 62) constitute a power source unit.

Operating Region of Turbo Compressor

Figure 4:
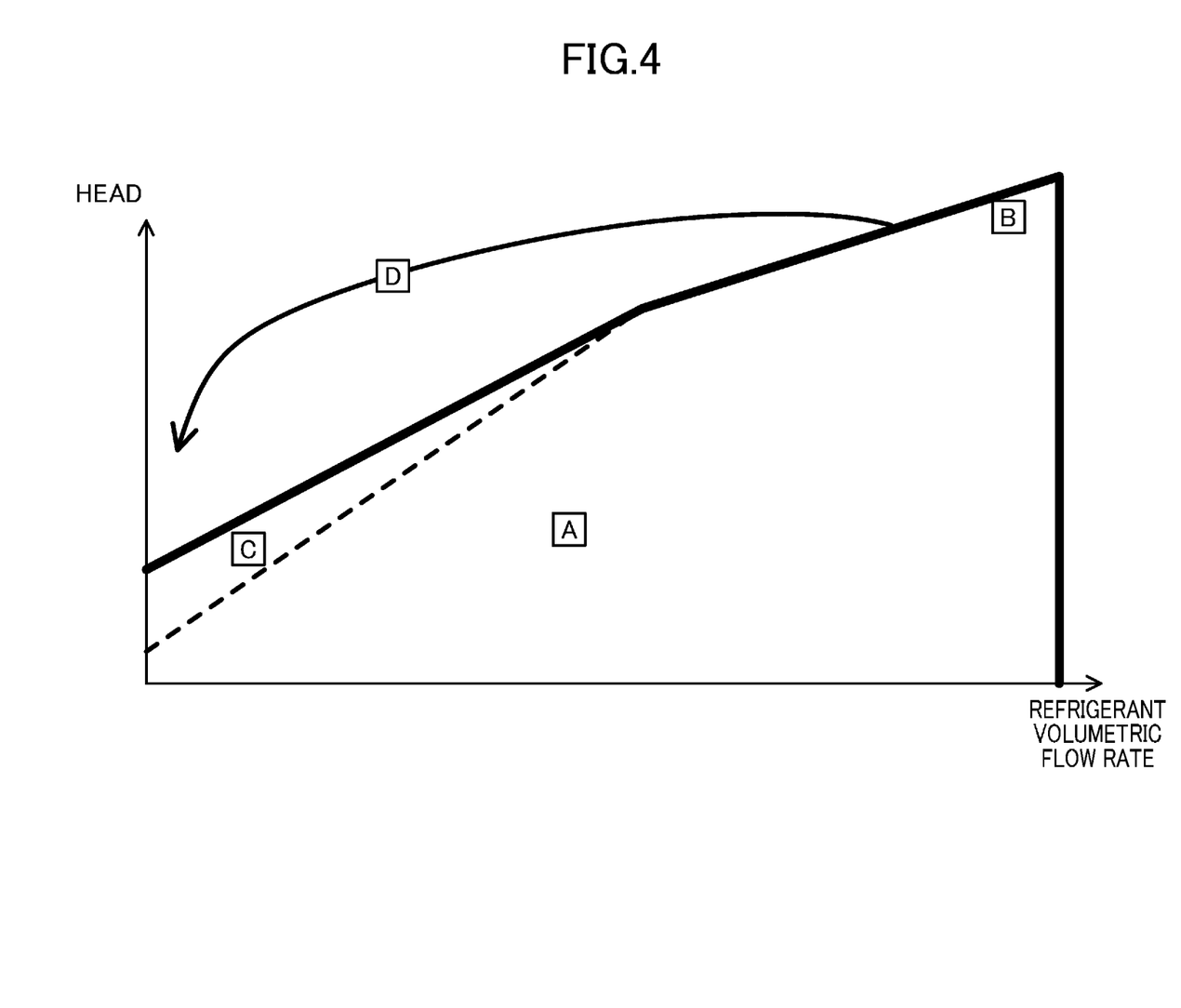
FIG. 4 is a diagram describing an operating region of the turbo compressor.

FIG. 4 is a diagram describing an operating region of the turbo compressor (12). In FIG. 4, the horizontal axis represents refrigerant volumetric flow rate, and the vertical axis represents head. The turbo compressor (12) can operate in a predetermined operating region upon being supplied with power by the first and second power source units (61, 62).

The predetermined operating region mainly includes regions located inside a surge line indicated by a bold line in FIG. 4, which include a steady operating region (A), a high-load torque region (B), and a turbulence region (C), and a surging region (D) located outside the surge line. As used herein, the high-load torque region (B) is also referred to as a "region in which the maximum driving torque of the turbo compressor (12) is required". The turbulence region (C) is also referred to as a "rotating-stall generation region".

The steady operating region (A) is a region that is indicated by symbol A in FIG. 4 and in which the load torque of the impeller (21) and the drive shaft (31) (that is, a torque for rotationally driving the impeller (21) and the drive shaft (31)) is relatively small and the radial load of the drive shaft (31) is also relatively small.

The high-load torque region (B) is a region that is indicated by symbol B in FIG. 4 and in which the load torque of the impeller (21) and the drive shaft (31) is relatively large and the radial load of the drive shaft (31) is also relatively large. The load torque of the impeller (21) and the drive shaft (31) in the turbo compressor (12) becomes maximum at the uppermost-rightmost point of the high-load torque region (B) in FIG. 4. Note that the radial load of the drive shaft (31) in the turbo compressor (12) does not become maximum in the high-load torque region (B).

The turbulence region (C) is a region that is indicated by symbol C in FIG. 4 and in which the load torque of the impeller (21) and the drive shaft (31) is relatively small whereas the radial load of the drive shaft (31) is relatively large.

The surging region (D) is a region that is indicated by symbol D in FIG. 4, and, in cases of emergency such as a blackout, the turbo compressor (12) may sometimes temporarily operate in the surging region (D). The surging region (D) is a region in which the load torque of the impeller (21) and the drive shaft (31) is relatively small whereas the radial load of the drive shaft (31) is relatively large. The radial load of the drive shaft (31) in the turbo compressor (12) becomes maximum at a predetermined point in the surging region (D).

Operation of Control Unit and Power Source Unit

The operation of the control unit (60) and the first and second power source units (61, 62) will be described. The control unit (60) supplies a voltage to and allows an armature current IA and a support current IS to flow through the armature windings (46a to 46c, 56a to 56c) and the support windings (47a to 47c, 57a to 57c) of the first and second bearingless motors (40, 50) so as to output a radial support force for supporting the radial load in accordance with the state of the turbo compressor (12).

The radial support force is the sum of a radial support force caused by the support current IS and a radial support force caused by both the armature current IA and the support current IS (referred to herein also as the radial support force caused by the armature current IA). The radial support force caused by both the armature current IA and the support current IS increases with an increase in the d-axis component of the armature current IA (hereinafter referred to as the d-axis current), decreases with a decrease in the d-axis current, increases with an increase in the absolute value of the q-axis component of the armature current IA (hereinafter referred to as the q-axis current), and decreases with a decrease in the absolute value of the q-axis current.

The control unit (60) controls the first power source unit (61) so that, for example, in the steady operating region (A), the armature windings (46a to 46c, 56a to 56c) can most efficiently generate a torque for the armature current IA (so-called maximum torque/current control), and controls the second power source unit (62) so that the support windings (47a to 47c, 57a to 57c) output a radial support force corresponding to the state of the turbo compressor (12).

Further, the control unit (60) controls the first and second power source units (61, 62) so that, for example, in a region other than the steady operating region (A), one of an armature voltage VA, which is a voltage across the armature windings (46a to 46c, 56a to 56c) of the first and second bearingless motors (40, 50), and the support current IS, which is a current flowing through the support windings (47a to 47c, 57a to 57c), is increased and the other of the armature voltage VA and the support current IS is decreased. The following describes several examples of the control described above.

Flux-Strengthening Control

The control unit (60) performs flux-strengthening control of the armature windings (46a to 46c, 56a to 56c) (that is, control to allow a positive d-axis current to flow), for example, in the turbulence region (C) and the surging region (D) in which the load torque is relatively small whereas the radial load is large, when the operation of the turbo compressor (12) is finished, and when the operation of the turbo compressor (12) is started.

The control unit (60) increases the armature voltage command value for the first power source unit (61) to increase the armature voltage VA across the first and second bearingless motors (40, 50), and decreases the support voltage command value for the second power source unit (62) to decrease the support current IS in the first and second bearingless motors (40, 50). Further, the control unit (60) controls the first and second power source units (61, 62) so that the support current IS in the first and second bearingless motors (40, 50) does not exceed a predetermined first upper limit (that is determined by, for example, the power source capacity of the second power source unit (62)). This does not increase the support current IS, but can increase the armature current IA, which is a current flowing through the armature windings (46*a* to 46*c*, 56*a* to 56*c*), to increase the radial support force. Thus, the power source capacity of the second power source unit (62) can be set to be relatively low for the maximum radial support force that can be generated by the first and second bearingless motors (40, 50).

Furthermore, for example, when the temperature of the support windings (47*a* to 47*c*, 57*a* to 57*c*) becomes greater than or equal to a predetermined reference value, the control unit (60) may cause the first power source unit (61) to perform flux-strengthening control and cause the second power source unit (62) to decrease the support current IS. This can reduce copper loss in the support windings (47*a* to 47*c*, 57*a* to 57*c*) to prevent an excessive temperature increase while maintaining the radial support force, and can thus improve the reliability of the turbo compressor (12).

Furthermore, for example, when the rotational speed of the first and second bearingless motors (40, 50) is relatively low and the armature voltage VA is relatively small accordingly, the control unit (60) may cause the first power source unit (61) to perform flux-strengthening control and cause the second power source unit (62) to decrease the support current IS. This can increase the armature voltage VA while maintaining the radial support force. With an increase in the accuracy of output of the armature voltage VA, the controllability of the first and second bearingless motors (40, 50) can be improved.

Furthermore, when an air gap between the rotors (41, 51) and the stators (44, 54) of the first and second bearingless motors (40, 50) is filled with oil, the control unit (60) may cause the first power source unit (61) to perform flux-strengthening control and cause the second power source unit (62) to decrease the support current IS. This can increase copper loss and iron loss in the armature windings (46*a* to 46*c*, 56*a* to 56*c*) to generate heat that warms the oil in the air gap to reduce the viscosity of the oil, resulting in a reduction in the rotational loss of the first and second bearingless motors (40, 50).

Furthermore, when the air conditioner (10) performs a heating operation, the control unit (60) may cause the first power source unit (61) to perform flux-strengthening control and cause the second power source unit (62) to decrease the support current IS. This can increase copper loss and iron loss in the armature windings (46*a* to 46*c*, 56*a* to 56*c*) to generate heat that heats the refrigerant present in the electric motor chamber (S2). The heating of the refrigerant results in the refrigerant accumulating heat which is discharged into air in the target space by the condenser (13). Thus, the heating performance of the air conditioner (10) can be improved.

Furthermore, when the demagnetization resistance of the permanent magnets (43, 53) of the first and second bearingless motors (40, 50) is small, the control unit (60) may cause the first power source unit (61) to perform flux-strengthening control and cause the second power source unit (62) to decrease the support current IS. Although the magnetic flux generated by the support current IS may cause demagnetization of the permanent magnets (43, 53), the control described above can make demagnetization less likely to occur. Thus, the permanent magnets (43, 53) having low coercivity can be used, leading to a reduction in cost, and, additionally, the design flexibility of the first and second bearingless motors (40, 50) can be enhanced.

Flux-Weakening Control

The control unit (60) performs flux-weakening control of the armature windings (46*a* to 46*c*, 56*a* to 56*c*) (that is, control to allow a negative d-axis current to flow), for example, in a high-speed operating region. The high-speed operating region is a region in which an operation is performed at a rotational speed higher than a rotational speed at which the armature voltage VA reaches a predetermined second upper limit (that is determined by, for example, the power source capacity of the first power source unit (61)) when flux-weakening control is not performed. When flux-weakening control is performed, the armature current IA is larger than that obtained otherwise.

The control unit (60) increases the support voltage command value for the second power source unit (62) to increase the support current IS in the first and second bearingless motors (40, 50), and decreases the armature voltage command value for the first power source unit (61) to decrease the armature voltage VA across the first and second bearingless motors (40, 50). Further, the control unit (60) controls the first and second power source units (61, 62) so that the armature voltage VA across the first and second bearingless motors (40, 50) does not exceed the second upper limit described above. This enables the turbo compressor (12) to operate in the high-speed operating region without increasing the armature voltage VA, and allows the reduction in radial support force caused by flux-weakening control to be compensated for by the increase in the support current IS. Thus, the power source capacity of the first power source unit (61) can be set to be relatively low with respect to the size of the high-speed operating region of the turbo compressor (12).

Furthermore, the control unit (60) may perform flux-weakening control, for example, when the operation of the turbo compressor (12) is started. When the operation of the turbo compressor (12) is started, the drive shaft (31) is supported by the first and second touch-down bearings (71, 72), and thus a relatively large radial support force is required due to the magnetic force of the permanent magnets (43, 53) of the first and second bearingless motors (40, 50). However, as a result of flux-weakening control, the pseudo-weakening of the magnetic force of the permanent magnets (43, 53) is obtained, and the required radial support force is reduced. Thus, the controllability of the first and second bearingless motors (40, 50) can be improved.

Furthermore, when an air gap between the rotors (41, 51) and the stators (44, 54) of the first and second bearingless motors (40, 50) is filled with oil, the control unit (60) may perform flux-weakening control and increase the support current IS. This can increase copper loss in the support windings (47*a* to 47*c*, 57*a* to 57*c*) to generate heat that warms the oil in the air gap to reduce the viscosity of the oil. This results in a reduction in the rotational loss of the first and second bearingless motors (40, 50).

Furthermore, when the air conditioner (10) performs a heating operation, the control unit (60) may perform flux-weakening control and increase the support current IS. This can increase copper loss in the support windings (47*a* to 47*c*, 57*a* to 57*c*) to generate heat that heats the refrigerant present in the electric motor chamber (S2). The heating of the refrigerant results in the refrigerant accumulating heat which is discharged into air in the target space by the condenser (13). Thus, the heating performance of the air conditioner (10) can be improved.

Regenerative Control

The control unit (60) performs regenerative control (that is, control to allow a negative q-axis current to flow), for example, at the end of the operation at which the radial load is increased.

The control unit (60) increases the armature voltage command value for the first power source unit (61) to increase the armature voltage VA across the first and second bearingless motors (40, 50), and decreases the support voltage command value for the second power source unit (62) to decrease the support current IS in the first and second bearingless motors (40, 50). Further, the control unit (60) controls the first and second power source units (61, 62) so that the support current IS in the first and second bearingless motors (40, 50) does not exceed the first upper limit described above. This does not increase the support current IS, but can increase the armature current IA to increase the radial support force. Thus, the power source capacity of the second power source unit (62) can be set to be relatively low for the maximum radial support force that can be generated by the first and second bearingless motors (40, 50). In addition, the regeneration of the rotational energy can increase energy saving of the turbo compressor (12) and can reduce the time taken to stop rotation.

Furthermore, in response to a sudden increase in radial load when the control unit (60) controls the first and second bearingless motors (40, 50) while the first power source unit (61) allows a positive q-axis current to flow, the control unit (60) may perform regenerative control in which a negative q-axis current whose absolute value is larger than that of the positive q-axis current flows. This can increase the radial support force without causing the second power source unit (62) to increase the support current IS. To achieve a similar advantage, the absolute value of the positive q-axis current may be increased without polarity inversion.

Advantages of Embodiment

An electric motor system (30) according to this embodiment includes a drive shaft (31) that rotationally drives a load (21); a first and second bearingless motors (40, 50) that include rotors (41, 51) and stators (44, 54) having armature windings (46a to 46c, 56a to 56c) and support windings (47a to 47c, 57a to 57c) and that rotationally drive the drive shaft (31) and support a radial load of the drive shaft (31) in a contactless manner; a first power source unit (61) for applying a voltage to the armature windings (46a to 46c, 56a to 56c); a second power source unit (62) for applying a voltage to the support windings (47a to 47c, 57a to 57c); and a control unit (60) that controls the first and second power source units (61, 62) so that one of an armature voltage VA, which is a voltage across the armature windings (46a to 46c, 56a to 56c), and a support current IS, which is a current flowing through the support windings (47a to 47c, 57a to 57c), is increased and the other of the armature voltage VA and the support current IS is decreased.

Thus, increasing one of the armature voltage VA and the support current IS and decreasing the other of the armature voltage VA and the support current IS can adjust the armature voltage VA and the support current IS within the respective ranges of the power source capacities of the first and second power source units (61, 62) in accordance with the operating status of an application to which the electric motor system (30) is applied. That is, if, due to the limited power source capacities of the first power source unit (61) and the second power source unit (62), the power source capacity of one of the power source units (61, 62) is insufficient to obtain desired output in the first and second bearingless motors (40, 50), the capacity insufficiency can be compensated for by the other power source unit (61, 62).

In the electric motor system (30) according to this embodiment, furthermore, the control unit (60) controls the first and second power source units (61.62) so that the armature voltage VA is increased and the support current IS is decreased or so that the support current IS is increased and the armature voltage VA is decreased. This control can expand the operating region of the electric motor system (30).

In the electric motor system (30) according to this embodiment, furthermore, the control unit (60) controls the first and second power source units (61, 62) so that the armature voltage VA is increased and the support current IS does not exceed a predetermined first upper limit. Thus, it is possible to increase a radial support force caused by the armature current IA, which is a current flowing through the armature windings (46a to 46c, 56a to 56c), while preventing the support current IS from exceeding the first upper limit. This corresponds to, for example, causing the first power source unit (61) to perform flux-strengthening control. This is effective particularly when the radial support force is increased with the support current IS reaching the first upper limit or reaching near the first upper limit.

In the electric motor system (30) according to this embodiment, furthermore, the control unit (60) controls the first and second power source units (61, 62) so that the support current IS is increased and the armature voltage VA does not exceed a predetermined second upper limit. Accordingly, it is possible to prevent the armature voltage VA from exceeding the second upper limit. However, for example, an increase in the rotational speed of the first and second bearingless motors (40, 50) may reduce the radial support force caused by the armature current IA. This corresponds to, for example, causing the first power source unit (61) to perform flux-weakening control. To address this, the second power source unit (62) is caused to increase the support current IS, and a radial support force caused by the increased support current IS can compensate for the reduction in the radial support force.

In the electric motor system (30) according to this embodiment, furthermore, the control unit (60) controls the first and second power source units (61, 62) so that the armature voltage VA is decreased and the support current IS is increased or so that the support current IS is decreased and the armature voltage VA is increased. With the control described above, for example, heat generated in the armature windings (46a to 46c, 56a to 56c) or the support windings (47a to 47c, 57a to 57c) can be utilized, as necessary.

In the electric motor system (30) according to this embodiment, furthermore, the control unit (60) controls the first and second power source units (61, 62) so that the armature voltage VA is decreased and the support current IS exceeds a predetermined first lower limit. Accordingly, the support current IS can exceed the first lower limit. Thus, for example, heat generated in the support windings (47a to 47c, 57a to 57c) can be utilized, as necessary, or, with an increase in the accuracy of detection of the support current IS, the controllability of the first and second bearingless motors (40, 50) can be improved.

In the electric motor system (30) according to this embodiment, furthermore, the control unit (60) controls the first and second power source units (61, 62) so that the support current IS is decreased and the armature voltage VA exceeds a predetermined second lower limit. Accordingly, the armature voltage VA can exceed the second lower limit.

Thus, for example, heat generated in the armature windings (46a to 46c, 56a to 56c) can be utilized, as necessary, or, with an increase in the accuracy of output of the armature voltage VA, the controllability of the first and second bearingless motors (40, 50) can be improved.

A turbo compressor (12) according to this embodiment includes the electric motor system (30) according to this embodiment, and an impeller (21) coupled to the drive shaft (31) of the electric motor system (30) and serving as the load (21). In the turbo compressor (12), accordingly, the impeller (21) is rotationally driven by the first and second bearingless motors (40, 50).

Further, the turbo compressor (12) according to this embodiment is disposed in a refrigerant circuit (11) that performs a refrigeration cycle, and is configured to compress refrigerant by using the impeller (21), and when the turbo compressor (12) operates in a rotating-stall generation region (C) or a surging region (D), the control unit (60) controls the first and second power source units (61, 62) so that the armature voltage VA is increased and the support current IS does not exceed a predetermined first upper limit. Accordingly, when the load torque of the first and second bearingless motors (40, 50) is small whereas the required radial support force is large, the radial support force caused by the armature current IA can be increased. Thus, even if the support current IS is kept less than or equal to the first upper limit, the increase in the armature current IA can increase the radial support force of the first and second bearingless motors (40, 50).

Other Embodiments

The embodiment described above may provide the following configuration.

For example, the electric motor system (30) may include a single bearingless motor or may include three or more bearingless motors. In the former case, the electric motor system (30) preferably includes a radial magnetic bearing.

The type of the first and second bearingless motors (40, 50) is not limited to a consequent-pole type, and may be, for example, a Surface Permanent Magnet (SPM) type in which a permanent magnet is attached to a surface of a rotor, an Interior Permanent Magnet (IPM) type in which a permanent magnet is embedded in a rotor, an inset-type, a BPM (Buried Permanent Magnet) type, a forward saliency type, or the like. The bearingless motors (40, 50) may be of different types. Each of the bearingless motors (40, 50) may be any one of a bearingless motor without saliency in which the d-axis self-inductance and the q-axis self-inductance of the armature are substantially equal, a bearingless motor with inverse saliency in which the d-axis self-inductance of the armature is less than the q-axis self-inductance, and a bearingless motor with forward saliency in which the d-axis self-inductance of the armature is greater than the q-axis self-inductance. Examples of the bearingless motor without saliency include a consequent-pole type and a surface permanent magnet type. Examples of the bearingless motor with inverse saliency include an interior permanent magnet type, an inset-type, and a BPM type. Examples of the bearingless motor with forward saliency include a forward saliency type.

The turbo compressor (12) may include two or more impellers (21). For example, one impeller (21) may be disposed at each end of the drive shaft (31).

The method for controlling the first power source unit (61) in the steady operating region (A) is not limited to maximum torque/current control. For example, maximum efficiency control (control to achieve the minimum loss) or power-factor-one control (control to achieve substantially one power factor) may be employed.

It goes without saying that the use of the electric motor system (30) is not limited to the turbo compressor (12).

While an embodiment and modifications have been described, it will be understood that various changes in form and details may be made without departing from the spirit and scope of the claims. Further, the embodiment and modifications described above may be combined or replaced, as desired, as long as the target functions of the present disclosure are not impaired.

As described above, the present disclosure is suitable for use in an electric motor system, and a turbo compressor provided with the same.

The invention claimed is:

1. An electric motor system comprising:
a drive shaft that rotationally drives a load;
a bearingless motor including a rotor and a stator having an armature winding and a support winding, the bearingless motor rotationally driving the drive shaft and supporting a radial load of the drive shaft in a contactless manner;
a power source unit configured to apply a voltage to the armature winding and the support winding; and
a control unit configured to control the power source unit
so that a radial support force that is a sum of a radial support force caused by a support current flowing through the support winding and a radial support force caused by both the support current and an armature current flowing through the armature winding is output, and
so that one of an armature voltage across the armature winding and the support current is increased and the other of the armature voltage and the support current is decreased.

2. The electric motor system according to claim 1, wherein
the control unit is further configured to control the power source unit
so that the armature voltage is increased and the support current is decreased or
so that the support current is increased and the armature voltage is decreased.

3. The electric motor system according to claim 1, wherein
the control unit is further configured to control the power source unit so that the armature voltage is increased and the support current does not exceed a predetermined first upper limit.

4. The electric motor system according to claim 1, wherein
the control unit is further configured to control the power source unit so that the support current is increased and the armature voltage does not exceed a predetermined second upper limit.

5. The electric motor system according to claim 1, wherein
the control unit is further configured to control the power source unit so that the armature voltage is decreased and the support current exceeds a predetermined first lower limit.

6. The electric motor system according to claim 1, wherein the control unit is further configured to control the power source unit so that the support current is decreased and the armature voltage exceeds a predetermined second lower limit.

7. A turbo compressor including the electric motor system according to claim 1, the turbo compressor further comprising:
an impeller coupled to the drive shaft of the electric motor system, the impeller serving as the load.

8. The turbo compressor according to claim 7, wherein
the turbo compressor is disposed in a refrigerant circuit that performs a refrigeration cycle, and the turbo compressor is configured to compress refrigerant by using the impeller, and
when the turbo compressor operates in a rotating-stall generation region or a surging region, the control unit is further configured to control the power source unit so that the armature voltage is increased and the support current does not exceed a predetermined first upper limit.

9. The electric motor system according to claim 2, wherein
the control unit is further configured to control the power source unit so that the support current is increased and the armature voltage does not exceed a predetermined second upper limit.

10. The electric motor system according to claim 2, wherein
the control unit is further configured to control the power source unit so that the armature voltage is decreased and the support current exceeds a predetermined first lower limit.

11. The electric motor system according to claim 2, wherein
the control unit is further configured to control the power source unit so that the support current is decreased and the armature voltage exceeds a predetermined second lower limit.

12. The electric motor system according to claim 3, wherein
the control unit is further configured to control the power source unit so that the support current is increased and the armature voltage does not exceed a predetermined second upper limit.

13. The electric motor system according to claim 3, wherein
the control unit is further configured to control the power source unit so that the armature voltage is decreased and the support current exceeds a predetermined first lower limit.

14. The electric motor system according to claim 3, wherein
the control unit is further configured to control the power source unit so that the support current is decreased and the armature voltage exceeds a predetermined second lower limit.

15. The electric motor system according to claim 4, wherein
the control unit is further configured to control the power source unit so that the armature voltage is decreased and the support current exceeds a predetermined first lower limit.

16. The electric motor system according to claim 4, wherein
the control unit is further configured to control the power source unit so that the support current is decreased and the armature voltage exceeds a predetermined second lower limit.

17. The electric motor system according to claim 5, wherein
the control unit is further configured to control the power source unit so that the support current is decreased and the armature voltage exceeds a predetermined second lower limit.

* * * * *